(12) United States Patent
Park et al.

(10) Patent No.: US 12,209,427 B2
(45) Date of Patent: Jan. 28, 2025

(54) ROOFTOP TENT FIXING DEVICE AND ROOFTOP TENT INCLUDING SAME

(71) Applicant: IKAMPER CO., LTD., Paju-si (KR)

(72) Inventors: Soon Gyu Park, Paju-si (KR); Jae Hwan Kim, Goyang-si (KR)

(73) Assignee: IKAMPER CO., LTD., Paju-si (KR)

( * ) Notice: Subject to any disclaimer, the term of this patent is extended or adjusted under 35 U.S.C. 154(b) by 813 days.

(21) Appl. No.: 17/468,675

(22) Filed: Sep. 8, 2021

(65) Prior Publication Data
US 2023/0019071 A1 Jan. 19, 2023

Related U.S. Application Data

(63) Continuation of application No. PCT/KR2021/010420, filed on Aug. 6, 2021.

(30) Foreign Application Priority Data

Jul. 13, 2021 (KR) .................... 10-2021-0091316

(51) Int. Cl.
*E04H 15/06* (2006.01)
*B60P 3/39* (2006.01)
*E04H 15/54* (2006.01)

(52) U.S. Cl.
CPC ............... *E04H 15/06* (2013.01); *B60P 3/39* (2013.01); *E04H 15/54* (2013.01)

(58) Field of Classification Search
CPC ......... E04H 15/06; E04H 15/34; E04H 15/44; E04H 15/48; F16B 2/06; F16B 2/065; F16B 2/12
See application file for complete search history.

(56) References Cited

U.S. PATENT DOCUMENTS 8,496,145 B2 *  7/2013  Sautter .................... B60R 9/048
                                                         224/924
9,381,866 B2 *  7/2016  Sautter ..................... B60R 9/10
(Continued)

FOREIGN PATENT DOCUMENTS

CH          583007 A5 * 12/1976
DE       2751561 A1 *  5/1979
(Continued)

OTHER PUBLICATIONS

Office Action of Canadian Patent Application No. 3,136,548 mailed Feb. 1, 2023.
(Continued)

*Primary Examiner* — Jonathan P Masinick
(74) *Attorney, Agent, or Firm* — Maier & Maier, PLLC

(57) ABSTRACT

A rooftop tent fixing device according to an embodiment of the present disclosure includes: clamp bodies provided in a pair; fixing brackets provided on upper portions of the clamp bodies and configured to detachably connect a fixing frame provided on a bottom surface of a rooftop tent and the clamp bodies, the fixing brackets having fastening holes; fastening members inserted and fastened into the fastening holes and having through-holes; a fastening rod inserted into the through-holes to connect the clamp bodies; and a locking member detachably coupled to one of the clamp bodies and configured to prevent removal of the fastening rod when coupled to one of the clamp bodies.

17 Claims, 9 Drawing Sheets

(56) References Cited

U.S. PATENT DOCUMENTS

| | | | |
|---|---|---|---|
| 10,125,517 B2 * | 11/2018 | Xu | B60P 3/34 |
| 10,208,502 B2 * | 2/2019 | Currid | E04H 15/06 |
| 10,543,771 B2 * | 1/2020 | Sautter | B60P 3/34 |
| 10,808,416 B2 * | 10/2020 | Park | E04H 15/06 |
| 10,920,445 B2 * | 2/2021 | Montesalvo | E04H 15/06 |
| 11,346,123 B2 * | 5/2022 | Park | E04H 15/06 |
| D978,770 S * | 2/2023 | Park | D12/412 |
| 11,680,421 B2 * | 6/2023 | Park | B60P 3/38 |
| | | | 135/88.15 |
| D999,324 S * | 9/2023 | Park | D21/834 |
| 11,753,844 B2 * | 9/2023 | Dunn | E04H 15/06 |
| | | | 135/88.14 |
| 11,772,567 B2 * | 10/2023 | Schroll | F16B 2/12 |
| | | | 224/324 |
| 2004/0195479 A1 * | 10/2004 | Gulley | F16B 2/12 |
| | | | 248/228.1 |
| 2017/0349080 A1 | 12/2017 | Sautter et al. | |
| 2019/0017287 A1 | 1/2019 | Currid | |
| 2024/0240490 A1 * | 7/2024 | Park | E04H 15/06 |
| 2024/0247516 A1 * | 7/2024 | Park | B60R 9/058 |
| 2024/0287829 A1 * | 8/2024 | Park | B60P 3/34 |

FOREIGN PATENT DOCUMENTS

| | | | | |
|---|---|---|---|---|
| DE | 202018100514 U1 * | 4/2018 | | |
| FR | 1049873 A * | 1/1954 | | |
| FR | 1190343 A * | 10/1959 | | |
| GB | 2246161 A * | 1/1992 | | B65D 90/0006 |
| KR | 101161621 B1 * | 7/2012 | | |
| KR | 10-2014-0013626 A | 2/2014 | | |
| KR | 10-1384696 B1 | 4/2014 | | |
| KR | 10-2020-0024007 A | 3/2020 | | |
| WO | WO-2020045961 A1 * | 3/2020 | | B60R 9/055 |

OTHER PUBLICATIONS

Written opinion of the international searching authority of PCT/KR2021/010420 mailed Apr. 12, 2022.

International Search Report of PCT/KR2021/010420 mailed Apr. 12, 2022.

* cited by examiner

ROOFTOP TENT FIXING DEVICE AND ROOFTOP TENT INCLUDING SAME

TECHNICAL FIELD

The present disclosure relates to a rooftop tent fixing device and a rooftop tent including same.

BACKGROUND

In general, a tent refers to an assembly type movable house that can be disassembled and transported. Nowadays, such a tent is mainly used for temporary camping in military, exploration, mountaineering and camping fields rather than everyday residential use.

The shape, size and material of a tent is changed depending on the purpose of use, the place of use, the number of people, the scale, etc.

In particular, the tents used for leisure activities such as mountaineering, camping, and the like have a capacity of about 5 to 10 people and a portable size. There are various types of tents for leisure activities, such as a triangle type, a roof type, a house type, a half-moon type, a dome type, etc.

Although such conventional tents are diverse in size, they are generally bulky, inconvenient to move, difficult to assemble, install and dismantle, and complex in structure, which may cause frequent failures of joints. In particular, when using a leisure tent, a user moves to a camping site mainly by using a vehicle, and then installs and uses the prepared tent at the camping site. The tent stored in the vehicle is bulky, which makes it difficult to store a lot of preparations together with the tent. In addition, there is an inconvenience in that the stored tent needs to be taken out from the vehicle and installed.

Furthermore, since a minimum flat ground for spreading and installing the tent has to be secured, there is a limitation in selecting a location for installing the tent.

In order to solve the problems of these conventional tents, a rooftop tent for a vehicle has been developed. The rooftop tent for a vehicle refers to a tent installed on the roof, i.e., the top of a vehicle and used just like a mobile home.

In general, the rooftop tent for a vehicle is installed on a frame such as a roof rack provided on the roof of a vehicle. The frame and the bottom portion of the rooftop tent need to be detachably fixed to each other through the use of a fixing means such as bolts, clamps or the like. However, in the case of fixing the rooftop tent to the frame of the vehicle through the use of such conventional fixing means, the fixing work is inconvenient because the work should be performed using a narrow space between the frame and the rooftop tent. Moreover, there is a possibility that a third party may dismantle the fixing means with malicious intention to steal the rooftop tent.

Accordingly, a demand has existed for research on a rooftop tent fixing means capable of maintaining a strong fixing force with a simple installation structure and preventing theft of a rooftop tent.

SUMMARY

The embodiments of the present disclosure have been conceived to solve the aforementioned problems of the related art, and to provide a rooftop tent fixing device capable of easily and conveniently fixing a rooftop tent to a frame of a vehicle and having an anti-theft function, and a rooftop tent including same.

According to an embodiment of the present disclosure, there is provided a rooftop tent fixing device, including: clamp bodies provided in a pair; fixing brackets provided on upper portions of the clamp bodies and configured to detachably connect a fixing frame provided on a bottom surface of a rooftop tent and the clamp bodies, the fixing brackets having fastening holes; fastening members inserted and fastened into the fastening holes and having through-holes with threads formed therein; and a fastening rod inserted into the through-holes to connect the clamp bodies and having a thread formed on an outer surface thereof so as to engage with the threads of the through-hoes, the fastening rod configured to, when rotated, adjust a distance between the clamp bodies.

In the rooftop tent fixing device according to an embodiment of the present disclosure, each of the clamp bodies may include a fixing surface member configured to form an upper surface of each of the clamp bodies and make contact with the fixing frame when fixed to the fixing frame, and side members formed by being bent downward from both width-direction edges of the fixing surface member.

In the rooftop tent fixing device according to an embodiment of the present disclosure, shock-absorbing members may be provided on the side members, and the shock-absorbing members may be provided at edges of the clamp bodies where the side members face each other.

In the rooftop tent fixing device according to an embodiment of the present disclosure, each of the shock-absorbing members may be provided with a locking protrusion extending toward each of the side members, and a locking hole may be formed inside each of the side members so that the locking protrusion can be fastened to the locking hole.

In the rooftop tent fixing device according to an embodiment of the present disclosure, each of the shock-absorbing members may be provided with an auxiliary locking protrusion extending toward each of the side members, and an auxiliary locking slit into which the auxiliary locking protrusion is inserted may be formed by cutting a portion of an edge of each of the side members.

The rooftop tent fixing device according to an embodiment of the present disclosure may further include: a locking member detachably coupled to one of the clamp bodies and configured to prevent removal of the fastening rod when coupled to one of the clamp bodies.

In the rooftop tent fixing device according to an embodiment of the present disclosure, the locking member may include a locking bracket provided so as to be inserted into an insertion groove formed in each of the side members, and a lock bolt inserted through a lock bolt insertion hole formed in the locking bracket and fastened to the locking bracket.

In the rooftop tent fixing device according to an embodiment of the present disclosure, the lock bolt may include a lock blade configured to be selectively inserted into a locking hole formed in each of the side members in a state in which the locking bracket is inserted into the insertion groove.

In the rooftop tent fixing device according to an embodiment of the present disclosure, the locking bracket may include a cover part formed so as to be inserted into the insertion groove to cover one side of each of the side members and having a lock bolt insertion hole formed therein, and a fastening rod separation prevention part extending upward from the cover part toward one of the fixing brackets so that an extended end portion is bent toward one of the fixing brackets to prevent separation of the fastening rod.

In the rooftop tent fixing device according to an embodiment of the present disclosure, each of the fixing brackets may include a spacer coupled to an upper surface of the fixing surface member, and a fastening part including a locking plate connected to an upper surface of the spacer and provided to be spaced apart from the fixing surface member and bent plates bent upward from both width-direction ends of the locking plate and formed with fastening holes.

In the rooftop tent fixing device according to an embodiment of the present disclosure, the fastening rod separation prevention part may have an end portion disposed inside the fastening part.

In the rooftop tent fixing device according to an embodiment of the present disclosure, the fastening rod may include a rod portion configured to connect the clamp bodies by being inserted into the through-holes of the fastening members of the clamp bodies and being coupled to the fastening members, and a head portion extending in a circumferential direction at one end of the rod portion and having a larger diameter than the rod portion, the head portion disposed inside of the fastening part of one of the clamp bodies to which the locking member is coupled.

In the rooftop tent fixing device according to an embodiment of the present disclosure, when the locking member is separated from one of the clamp bodies, the fastening rod may come into a state in which the fastening rod is separable from the fastening members, and when the locking member is coupled to one of the clamp bodies, the fastening rod may come into a state in which the locking member prevents the fastening rod from being separated from the fastening members.

According to another embodiment of the present disclosure, there is provided a rooftop tent, including: a lower plate having a fixing frame to which the rooftop tent fixing device according to an embodiment of the present disclosure is slidingly coupled; an upper plate rotatably provided at one end of the lower plate; and an extension plate having one end rotatably coupled to the other end of the lower plate, the extension plate configured to be disposed on the upper side of the lower plate by rotation thereof or disposed on the outside of the lower plate so that an upper surface of the extension plate is parallel to an upper surface of the lower plate.

In the rooftop tent according to another embodiment of the present disclosure, a tension pole bracket configured to support a pole may be provided at the other end of the extension plate, and the tension pole bracket may include a coupling bracket provided so as to surround the other end of the extension plate and having a tension pole insertion hole into which the pole is inserted, and a rigid reinforcement panel slidingly coupled to one surface of the coupling bracket having the tension pole insertion hole and configured to support an end of the pole when the pole is inserted into the tension pole insertion hole.

In the rooftop tent according to another embodiment of the present disclosure, a through-hole may be formed in at least one of the lower plate and the extension plate, and a tube cap may be inserted into and coupled to the through-hole.

In the rooftop tent according to another embodiment of the present disclosure, the tube cap may include a lower cap inserted into the through-hole and fixed to the lower plate or the extension plate and having a passage formed therein, and an upper cap detachably coupled to one end of the lower cap to open and close the passage.

With the rooftop tent fixing device and the rooftop tent according to the embodiments of the present disclosure, it is possible to conveniently fix a rooftop tent to a frame of a vehicle and enjoy an anti-theft function.

DETAILED DESCRIPTION

Figure 1:
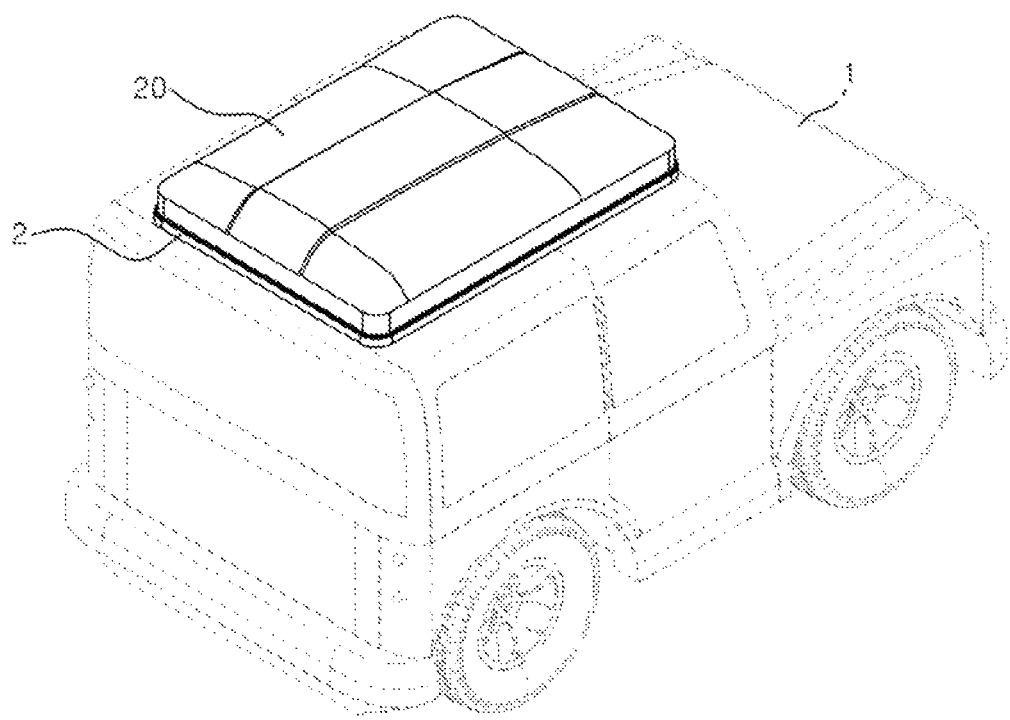
FIG. 1 is a perspective view illustrating a state in which a rooftop tent is fixed to a roof of a vehicle by a rooftop tent fixing device according to an embodiment of the present disclosure.

Hereinafter, specific embodiments for implementing the spirit of the present disclosure will be described in detail with reference to the drawings.

In addition, in describing the present disclosure, if it is determined that a detailed description of a related known configuration or function may obscure the subject matter of the present disclosure, the detailed description thereof will be omitted.

In addition, when one component is referred to as being 'connected to', 'supported by' or 'in contact with' another component, it should be understood that one component may be directly connected to, supported by or in contact with another component and a further component may exist between one component and another component.

The terms used in the subject specification are only used to describe specific embodiments, and are not intended to limit the present disclosure. Singular expressions include plural expressions unless the context clearly indicates otherwise.

In addition, in the subject specification, expressions such as upper side, lower side, side surface, and the like are defined with reference to the illustration in the drawings. It should be noted that if the direction of the corresponding object is changed, the object may be expressed differently. For the same reason, some components in the accompanying drawings are exaggerated, omitted, or schematically illustrated. The size of each component does not thoroughly reflect the actual size.

In addition, the terms including ordinal numbers such as first and second may be used to describe various components, but the corresponding components are not limited by such terms. These terms are only used for the purpose of distinguishing one component from another.

The meaning of "comprise" or "include" as used in the specification specifies a specific characteristic, region, integer, step, operation, element and/or component, and does not exclude the existence or addition of other specific characteristic, region, integer, step, operation, element, component and/or group.

Hereinafter, a rooftop tent fixing device according to an embodiment of the present disclosure will be described with reference to the drawings.

Figure 2:
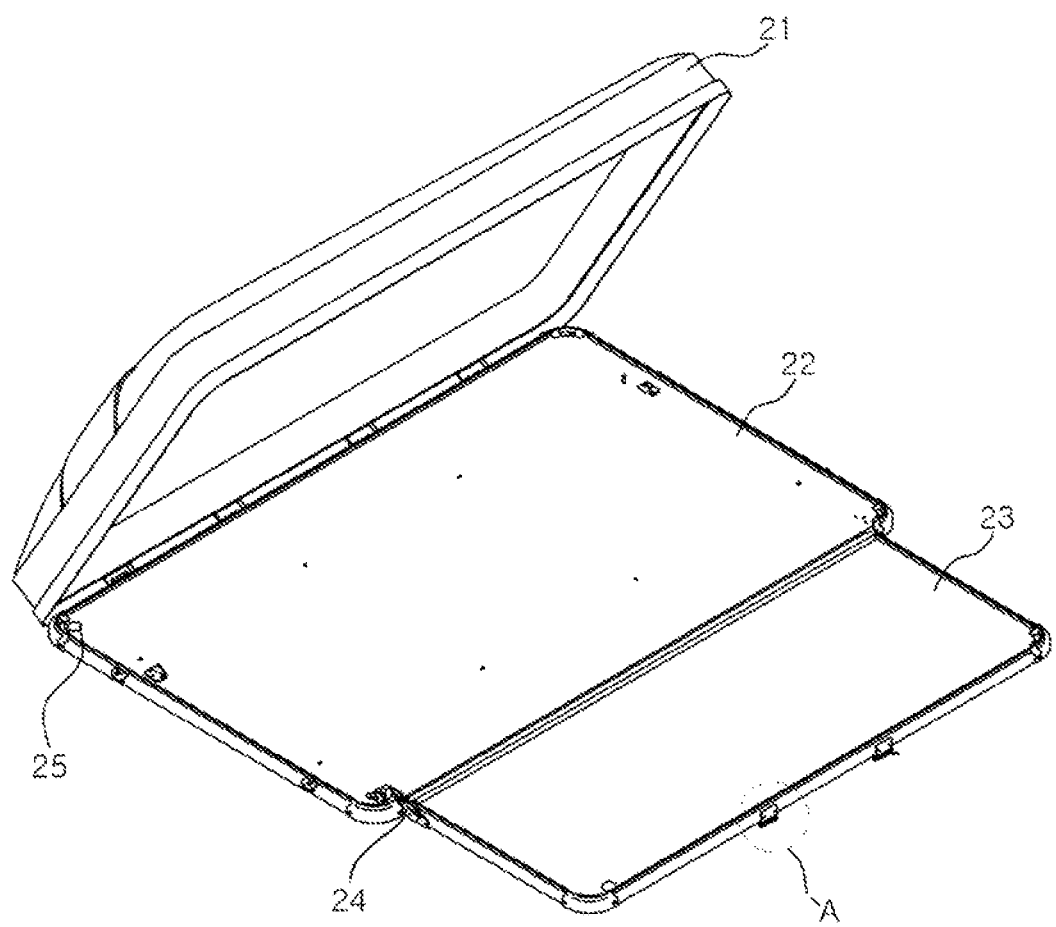
FIG. 2 is a perspective view of the rooftop tent to which the rooftop tent fixing device according to an embodiment of the present disclosure is connected.
Figure 3:
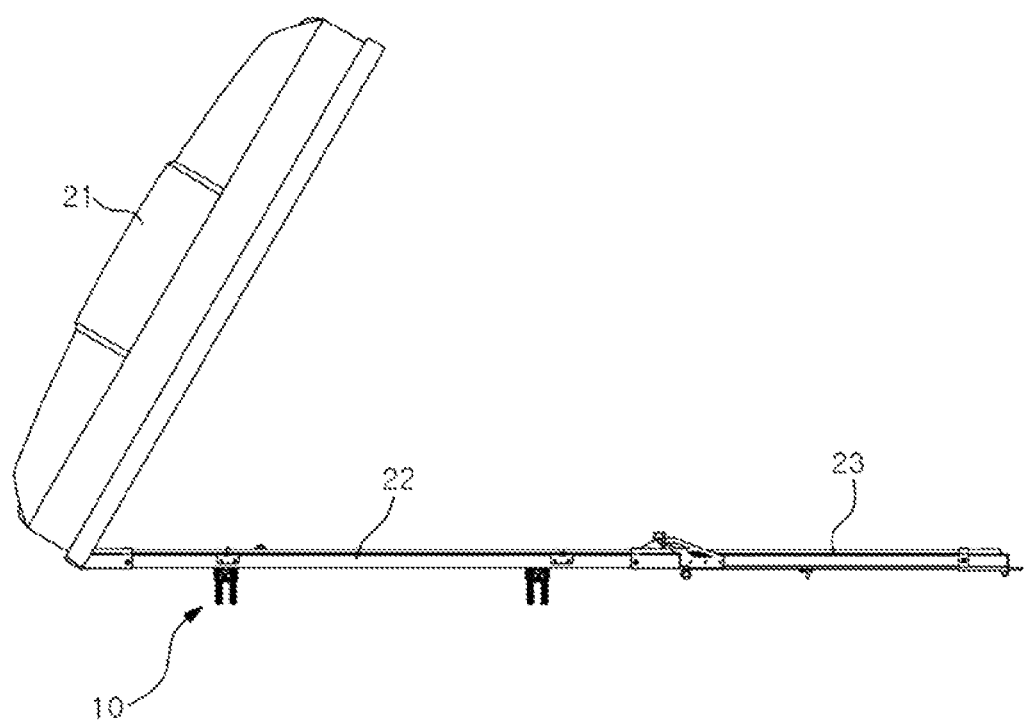
FIG. 3 is a side view of the rooftop tent to which the rooftop tent fixing device according to an embodiment of the present disclosure is connected.
Figure 4:
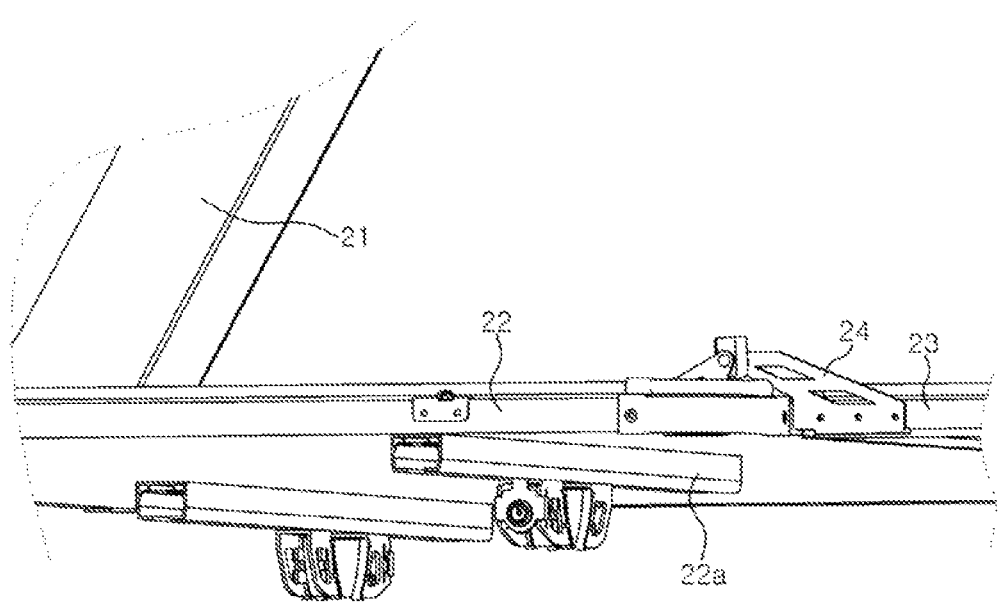
FIG. 4 is a partial bottom perspective view of the rooftop tent to which the rooftop tent fixing device according to an embodiment of the present disclosure is connected.

Referring to FIGS. 1 to 4, a rooftop tent 20 may be transported by being fixedly installed on a roof rack 2 of a vehicle 1. In order to use the rooftop tent 20 for residential purposes when arriving at a campsite, the rooftop tent 20 is merely unfolded in a state in which the rooftop tent 20 is mounted on the roof rack 2 of the vehicle 1, which makes it possible to completely install the rooftop tent 20. The rooftop tent 20 may be installed so that the portion thereof protruding outside the roof rack 2 of the vehicle 1 can be supported by a member such as a ladder or the like after the installation is completed.

The rooftop tent 20 may be connected to the roof rack 2 by the rooftop tent fixing device 10 according to an embodiment of the present disclosure, and may include, for example, a lower plate 22 and an upper plate 21 rotatably coupled to one end of the lower plate 22. A space for accommodating the tent may be formed inside the upper plate 21 and the lower plate 22. In addition, an extension plate 23 may be rotatably provided on the lower plate 22. One end of the extension plate 23 may be rotatably connected to the other end of the lower plate 22, and may be connected using a separate hinge part 24.

A fixing frame 22a may be provided on the lower surface of the lower plate 22. The fixing frame 22a may be provided in a beam shape having a rail groove formed therein. The rooftop tent fixing device 10 may be slidingly coupled to the fixing frame 22a and fixed at a predetermined position.

A tension pole bracket 231 may be provided at the other end of the extension plate 23. The tension pole bracket 231 may support a pole that supports the tent when the tent is installed inside the upper plate 21 and the lower plate 22. The tension pole bracket 231 may include a coupling bracket 231a provided so as to surround the other end of the extension plate 23 and having a tension pole insertion hole 231b formed therein, and a rigid reinforcement panel 231c slidingly coupled to one surface of the coupling bracket 231a having the tension pole insertion hole 231b and configured to withstand the tension caused by the pole when the pole is inserted into the tension pole insertion hole 231b. In other words, the rigid reinforcement panel 231c may support the end of the pole.

Meanwhile, at least one cable penetration hole 25 through which an electric wire, a cable or the like can pass may be formed in at least one of the lower plate 22 and the extension plate 23. A tube cap 26 may be coupled to the cable penetration hole 25.

The tube cap 26 may be inserted into and fixed to the cable penetration hole 25. The tube cap 26 may include, for example, a lower cap 26a inserted into and fixed to the lower plate 22 or the extension plate 23 and having a passage formed therein so that a wire, a cable or the like can pass therethrough, and an upper cap 26b detachably coupled to one end of the lower cap 26a to open and close the passage formed in the lower cap 26a. If necessary, a user may separate the upper cap 26b from the lower cap 26a and then may insert a wire, a cable or the like through the lower cap 26a.

Figure 5:
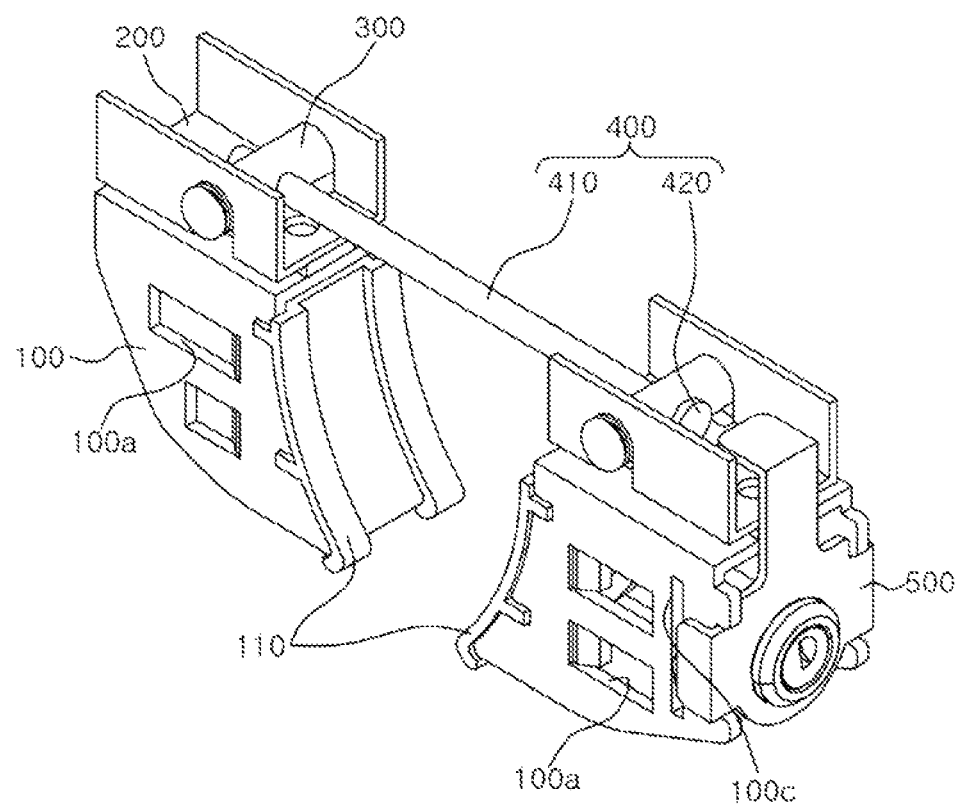
FIG. 5 is a schematic perspective view of the rooftop tent fixing device according to an embodiment of the present disclosure.
Figure 6:
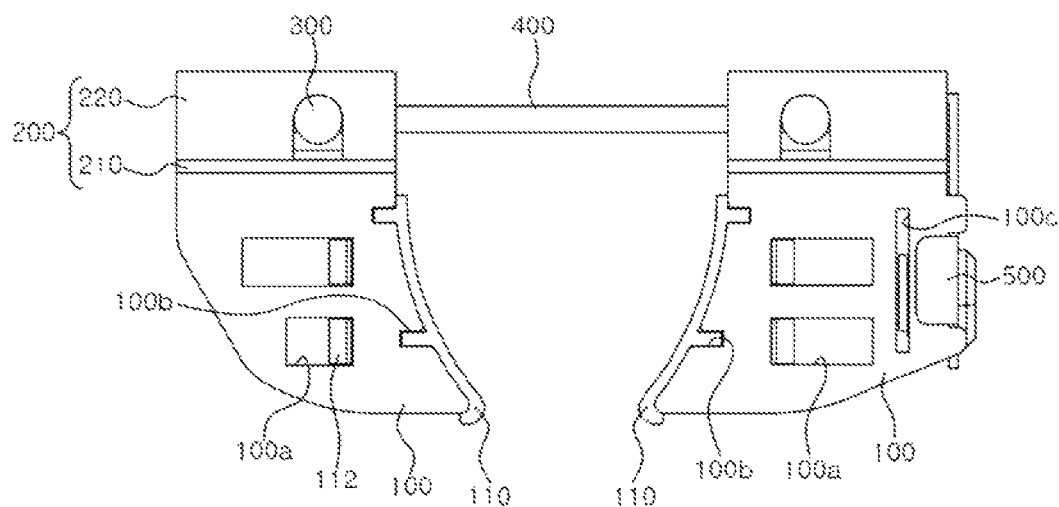
FIG. 6 is a schematic side view of the rooftop tent fixing device according to an embodiment of the present disclosure.
Figure 7:
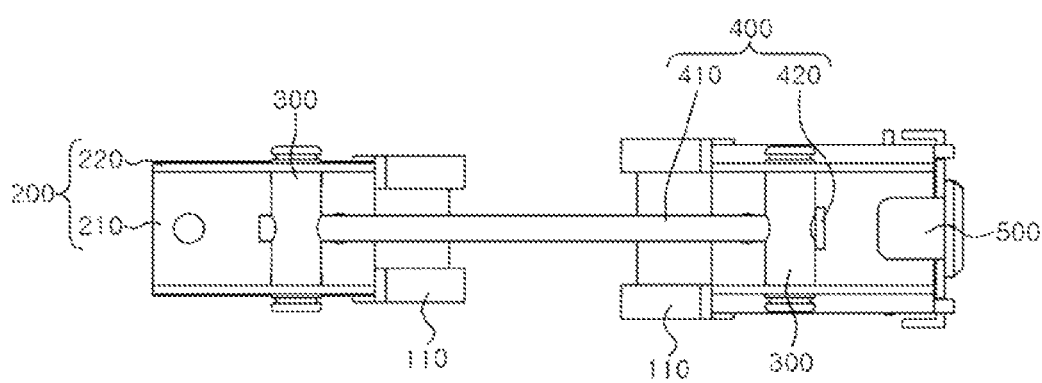
FIG. 7 is a schematic plan view of the rooftop tent fixing device according to an embodiment of the present disclosure.
Figure 8:
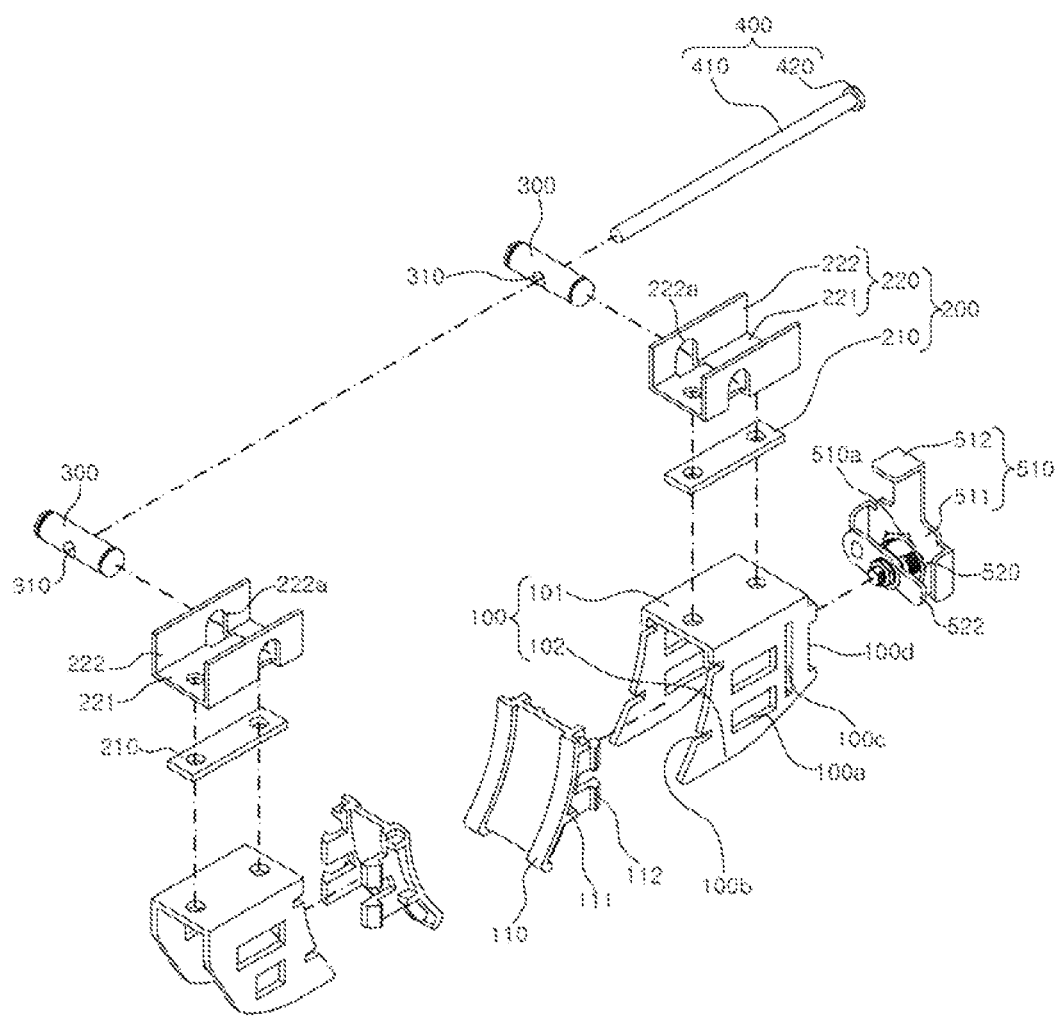
FIG. 8 is a schematic exploded perspective view of the rooftop tent fixing device according to an embodiment of the present disclosure.
Figure 9:
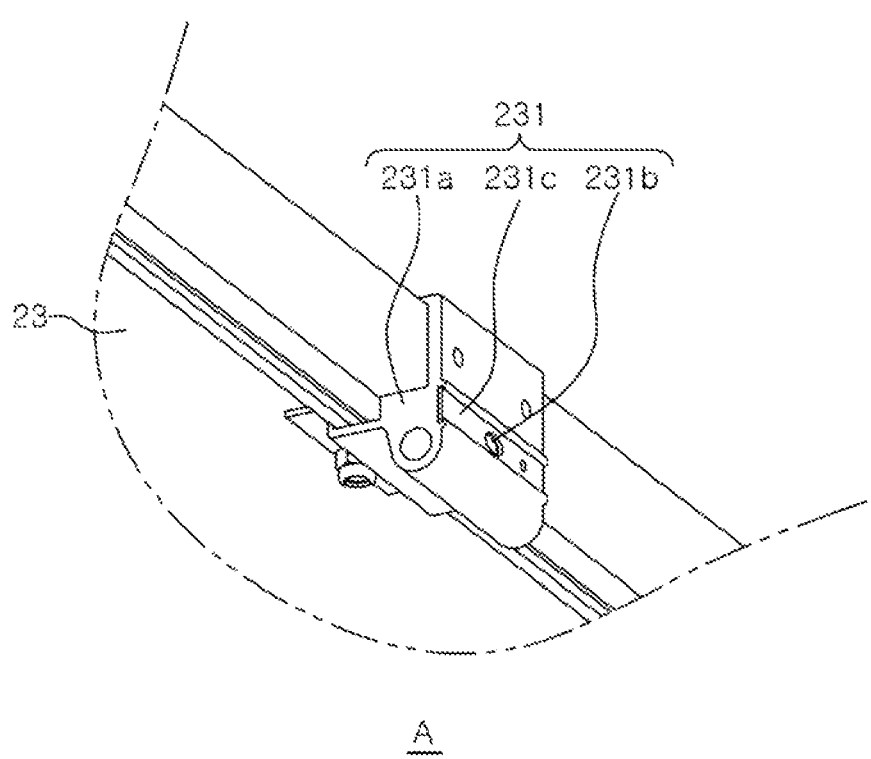
FIG. 9 is an enlarged view of part A in FIG. 2.
Figure 10:
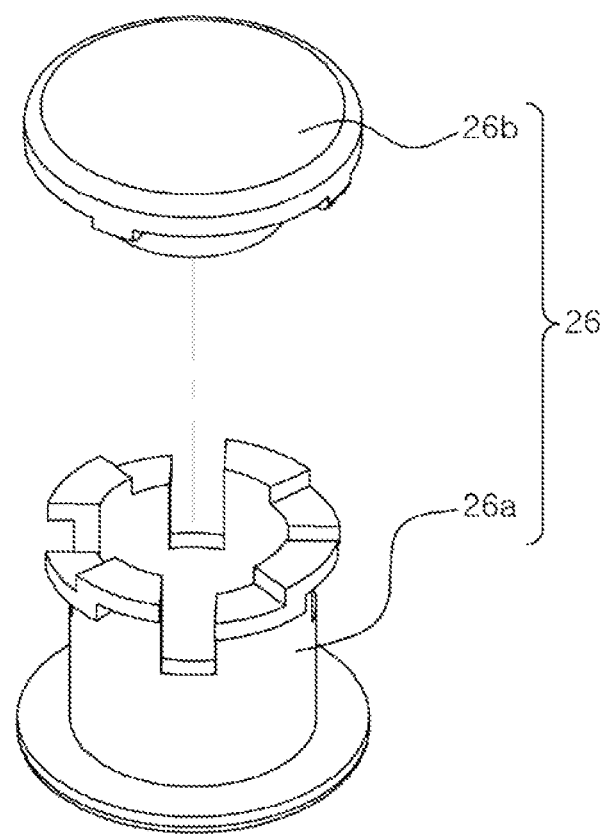
FIG. 10 is a schematic exploded perspective view of a tube cap according to an embodiment of the present disclosure.

Referring to FIGS. 4 to 7, the rooftop tent fixing device 10 according to an embodiment of the present disclosure may include: clamp bodies 100 provided in a pair; fixing brackets 200 provided on the upper portions of the clamp bodies 100 and configured to detachably connect the fixing frame 22a provided on the bottom surface of the rooftop tent 20 and the clamp bodies 100, the fixing brackets 200 having fastening holes 222a; fastening members 300 inserted and fastened into the fastening holes 222a and having through-holes 310 formed therein; a fastening rod 400 inserted into the through-holes 310 to connect the clamp bodies 100 provided in a pair; and a locking member 500 detachably coupled to one of the clamp bodies 100 provided in a pair and configured to prevent removal of the fastening rod 400 when coupled to one of the clamp bodies 100.

Each of the clamp bodies 100 may include, for example, a fixing surface member 101 configured to form an upper surface of each of the clamp bodies 100 and make contact with the fixing frame 22a when fixed to the fixing frame 22a, and side members 102 formed by being bent downward from both width-direction edges of the fixing surface member 101. In other words, the side members 102 may extend downward from one width-direction edge and the other width-direction edge of the fixing surface member 101. Accordingly, each of the clamp bodies 100 may have a 'C'-like side shape. The fixing surface member 101 and the side members 102 may be integrally formed, or may be manufactured as separate members and coupled to each other.

Each of the fixing brackets 200 may be fastened to the fixing surface member 101. The fixing brackets 200 may be inserted into and fixed to the fixing frame 22a.

One side of each of the side members 102 may be provided to be inclined inward toward the lower side. The rooftop tent fixing device 10 is connected to one of a plurality of beams constituting the roof rack 2. At this time, the clamp bodies 100 provided in a pair may be coupled so as to press the beam from both sides with the beam interposed therebetween. Accordingly, in order to prevent the clamp bodies 100 from being separated from the beam, one side of each of the side members 102 of the clamp bodies 100 may be inclined inward toward the lower side. In this regard, the expression that one side of each of the side members 102 is inclined inward toward the lower side includes a configuration in which one side of each of the side members 102 is formed in a curvilinear shape to protrude inward toward the lower side.

Each of the side members 102 may be provided with a shock-absorbing member 110. The shock-absorbing member 110 may be provided at one edge of each of the side members 102 of the clamp bodies 100 facing each other. In other words, the shock-absorbing member 110 may be provided at an inclined edge of one side of each of the side members 102. The shock-absorbing member 110 may be provided in a shape corresponding to the shape of the inclined edge of each of the side members 102 so as to cover the inclined one edge of each of the side members 102.

The shock-absorbing member 110 is provided to enhance the coupling force between the clamp bodies 100 and the beam provided on the roof rack 2 and to reduce the shock generated between the clamp bodies 100 and the beam provided on the roof rack 2. The shock-absorbing member 110 may be made of an elastic material. For example, the shock-absorbing member 110 may be made of a rubber material.

The shock-absorbing member 110 may be provided with a locking protrusion 112 extending toward each of the side members 102. A locking hole 100a may be formed inside each of the side members 102 so that the locking protrusion 112 can be inserted into and fastened to the locking hole 100a. The locking protrusion 112 may be provided in a hook shape, and may be inserted into the locking hole 100a to fix the shock-absorbing member 110 to each of the side members 102. In addition, the shock-absorbing member 110 may be provided with an auxiliary locking protrusion 111 extending toward each of the side members 102. An auxiliary locking slit 100b into which the auxiliary locking protrusion 111 is inserted may be formed by cutting a portion of the edge of each of the side members 102. At least one auxiliary locking protrusion 111 and at least one auxiliary locking slit 100b may be provided in the vertical direction.

The auxiliary locking protrusion 111 may prevent the shock-absorbing member 110 from moving in the vertical direction on each of the side members 102 so that the shock-absorbing member 110 can be more firmly in close contact with each of the side members 102.

The fixing brackets 200 may be provided to connect the clamp bodies 100 and the fixing frame 22a. The fixing brackets 200 may be connected to the upper surfaces, i.e., the fixing surface members 101 of the clamp bodies 100.

Each of the fixing brackets 200 may include, for example, a spacer 210 coupled to the upper surface of the fixing surface member 101, and a fastening part 220 including a locking plate 221 connected to the upper surface of the spacer 210 and provided to be spaced apart from the fixing surface member 101 and bent plates 222 bent upward from both width-direction ends of the locking plate 221 and formed with fastening holes 222a. The fixing brackets 200 may be slidingly coupled to the fixing frame 22a. When the fixing brackets 200 are slidingly coupled to the fixing frame 22a, the lower surface of the locking plate 221 and the upper surface of the fixing surface member 101 may be brought into contact with the fixing frame 22a.

Each of the fastening members 300 may be inserted into and coupled to the fastening hole 222a formed in the bent plate 222. The fastening members 300 may be disposed in the width direction of the fixing brackets 200. Therefore, one end of each of the fastening members 300 may be exposed to the outside through the bent plate 222 formed on one side of the locking plate 221, and the other end of each of the fastening members 300 may be exposed to the outside through the bent plate 222 formed on the other side of the locking plate 221. Each of the fastening members 300 may have a through-hole 310 formed therein. The through-hole 310 may be formed to face the adjacent fastening member 300. In other words, the through-holes 310 may be formed in the respective fastening members 300 of the clamp bodies 100 provided in a pair. The through-holes 310 may be formed to at least partially overlap with each other. For example, the through-holes 310 formed in the respective fastening members 300 of the clamp bodies 100 provided in a pair may have the same center line. Accordingly, the fastening rod 400 may be coupled to the fastening members 300 so as to pass through all the through-holes 310 of the two fastening members 300.

The fastening rod 400 may be connected to the through-holes 310 of the fastening members 300 to connect the clamp bodies 100 provided in a pair. The fastening rod 400 may include, for example, a rod portion 410 configured to connect the clamp bodies 100 by being coupled to the fastening members 300 of the clamp bodies 100 provided in a pair, and a head portion 420 extending in a circumferential direction at one end of the rod portion 410 and having a larger diameter than the rod portion 410. The head portion 420 may be disposed inside the fastening part 220 of one of the clamp bodies 100 to which the locking member 500 is coupled.

A male thread may be formed on the outer surface of the rod portion 410, and female threads corresponding to the male thread may be formed on the inner surfaces of the through-holes 310. Of course, a female thread may be formed on the outer surface of the rod portion 410, and male threads corresponding to the female thread may be formed on the inner surfaces of the through-holes 310. In other words, threads may be formed on the inner surfaces of the through-holes 310, and a thread engaged with the threads formed in the through-holes 310 may be formed on the outer surface of the rod portion 410. Accordingly, when the rod portion 410 is rotated while being inserted into the through-holes 310, the distance between the clamp bodies 100 provided in a pair can be adjusted. The roof rack 2 of the vehicle 1 may be provided with a plurality of beams (not shown). The beams may be disposed between the clamp bodies 100 provided in a pair. The clamp bodies 100 may be brought into close contact with the beams by rotating the fastening rod 400 in a state in which the beams are disposed on the clamp bodies 100. In addition, since the side members 102 of the clamp bodies 100 are provided as inclined surfaces, the rooftop tent fixing device 10 according to an embodiment of the present disclosure can be coupled to the beams provided on the roof rack 2 by bringing the clamp bodies 100 into close contact with the beams in this way.

The locking member 500 is selectively fixed to one of the clamp bodies 100, and is provided to cover the fastening rod 400 when fixed to one of the clamp bodies 100. The locking member 500 may be provided so as to be inserted into the insertion groove 100d formed in the other edge of each of the side members 102. For example, the locking member 500 may include a locking bracket 510 provided so as to be inserted into the insertion groove 100d formed in each of the side members 102, and a lock bolt 520 inserted through a lock bolt insertion hole 510a formed in the locking bracket 510 and fastened to the locking bracket 510. The locking member 500 may also be made of a material having high rigidity just like the clamp bodies 100, and may be made of, for example, a steel-based material.

The locking bracket 510 may include a cover part 511 formed so as to be inserted into the insertion groove 100d to cover one side of each of the side members 102 and having a lock bolt insertion hole 510a formed therein, and a fastening rod separation prevention part 512 extending upward from the cover part 511 toward one of the fixing brackets 200 so that the extended end portion is bent toward one of the fixing brackets 200 to prevent separation of the fastening rod 400.

The lock bolt insertion hole 510a may be formed inside the cover part 511, and the lock bolt 520 may be inserted into the lock bolt insertion hole 510a and connected to the cover part 511 so that a key insertion part 521 is exposed to the outside. The lock bolt 520 may include a lock blade 522 configured to be selectively inserted into the locking hole 100c formed in each of the side members 102 when a key is inserted into the key insertion part 521 and rotated in a state in which the lock bolt 520 is inserted into the locking bracket 510, more specifically the cover part 511. When the lock blade 522 is inserted into the locking hole 100c, the locking member 500 is bound to one of the clamp bodies 100 and cannot be separated. However, if when the lock blade 522 is removed from the locking hole 100c, the locking member 500 may be separated from one of the clamp bodies 100.

An upwardly extending fastening rod separation prevention part 512 may be provided on one side of the cover part 511. The cover part 511 and the fastening rod separation prevention part 512 may be integrally formed. The fastening rod separation prevention part 512 may be provided to prevent the fastening rod 400 from being separated from the fastening members 300. The extended end portion of the fastening rod separation prevention part 512 may be bent and disposed inside the fixing brackets 200.

The locking member 500 may be coupled to one of the clamp bodies 100 in which the head portion 420 of the fastening rod 400 is disposed, and the bent end portion of the fastening rod separation prevention part 512 may be disposed so as to face the head portion 420. Accordingly, the fastening rod 400 may be prevented from being separated by the interference of the fastening rod separation prevention part 512.

Hereinafter, the operations and effects of the rooftop tent fixing device 10 according to an embodiment of the present disclosure will be described.

By using the rooftop tent fixing device 10 according to an embodiment of the present disclosure, the clamp bodies 100 may be inserted into and fastened to the fixing frame 22a installed on the bottom surface of the rooftop tent 210. In a state in which the clamp bodies 100 are fastened to the fixed frame 22a, the rooftop tent 20 may be mounted on the upper side of the roof. In this case, one of the beams constituting the roof may be disposed between the clamp bodies 100. Thereafter, the user may rotate the fastening rod 400 to adjust the distance between the clamp bodies 100 so that the clamp bodies 100 can be pressed against the beams.

After bringing the clamp bodies 100 and the beams into contact with each other, the user may insert the locking member 500 into the insertion groove 100d of one of the clamp bodies 100 in order to prevent theft. Thereafter, by inserting the key into the key insertion portion 521 and rotating the key, it is possible to insert the lock blade 522 into the locking hole 100c.

While the embodiments of the present disclosure have been described above as specific examples, these embodiments are nothing more than examples. The present disclosure is not limited thereto, and should be construed as having the widest scope in accordance with the basic idea disclosed herein. Those skilled in the art may combine or substitute the disclosed embodiments to implement a pattern of a shape not indicated herein. This also does not depart from the scope of the present disclosure. In addition, those skilled in the art may easily change or modify the disclosed embodiments based on the subject specification. It is apparent that such changes or modifications also belong to the scope of the present disclosure.

What is claimed is:

1. A rooftop tent fixing device, comprising:
    clamp bodies provided in a pair;
    fixing brackets provided on upper portions of the clamp bodies and configured to detachably connect a fixing frame provided on a bottom surface of a rooftop tent and the clamp bodies, the fixing brackets having fastening holes;
    fastening members inserted and fastened into the fastening holes and having through-holes with threads formed therein; and
    a fastening rod inserted into the through-holes to connect the clamp bodies and having a thread formed on an outer surface thereof so as to engage with the threads of the through-hoes, the fastening rod configured to, when rotated, adjust a distance between the clamp bodies.

2. The device of claim 1, wherein each of the clamp bodies includes a fixing surface member configured to form an upper surface of each of the clamp bodies and make contact with the fixing frame when fixed to the fixing frame, and side members formed by being bent downward from both width-direction edges of the fixing surface member.

3. The device of claim 2, wherein shock-absorbing members are provided on the side members, and
    the shock-absorbing members are provided at edges of the clamp bodies where the side members face each other.

4. The device of claim 3, wherein each of the shock-absorbing members is provided with a locking protrusion extending toward each of the side members, and a locking hole is formed inside each of the side members so that the locking protrusion can be fastened to the locking hole.

5. The device of claim 3, wherein each of the shock-absorbing members is provided with an auxiliary locking protrusion extending toward each of the side members, and an auxiliary locking slit into which the auxiliary locking protrusion is inserted is formed by cutting a portion of an edge of each of the side members.

6. The device of claim 1, further comprising:
    a locking member detachably coupled to one of the clamp bodies and configured to prevent removal of the fastening rod when coupled to one of the clamp bodies.

7. The device of claim 6, wherein the locking member includes a locking bracket provided so as to be inserted into an insertion groove formed in each of the side members, and a lock bolt inserted through a lock bolt insertion hole formed in the locking bracket and fastened to the locking bracket.

8. The device of claim 7, wherein the lock bolt includes a lock blade configured to be selectively inserted into a locking hole formed in each of the side members in a state in which the locking bracket is inserted into the insertion groove.

9. The device of claim 7, wherein the locking bracket includes a cover part formed so as to be inserted into the insertion groove to cover one side of each of the side members and having the lock bolt insertion hole formed therein, and a fastening rod separation prevention part extending upward from the cover part toward one of the fixing brackets so that an extended end portion is bent toward one of the fixing brackets to prevent separation of the fastening rod.

10. The device of claim 9, wherein each of the fixing brackets includes a spacer coupled to an upper surface of a fixing surface member of each clamp body, and a fastening part including a locking plate connected to an upper surface of the spacer and provided to be spaced apart from the fixing surface member and bent plates bent upward from both width-direction ends of the locking plate and formed with fastening holes.

11. The device of claim 10, wherein the fastening rod separation prevention part has the extended end portion disposed inside the fastening part.

12. The device of claim 10, wherein the fastening rod includes a rod portion configured to connect the clamp bodies by being inserted into the through-holes of the fastening members of the clamp bodies and being coupled to the fastening members, and a head portion extending in a circumferential direction at one end of the rod portion and having a larger diameter than the rod portion, the head portion disposed inside of the fastening part of one of the clamp bodies to which the locking member is coupled.

13. The device of claim 12, wherein when the locking member is separated from one of the clamp bodies, the fastening rod comes into a state in which the fastening rod is separable from the fastening members, and when the locking member is coupled to one of the clamp bodies, the fastening rod comes into a state in which the locking member prevents the fastening rod from being separated from the fastening members.

14. A rooftop tent, comprising:

a lower plate having a fixing frame to which the rooftop tent fixing device of claim 1 is slidably coupled;

an upper plate rotatably provided at one end of the lower plate; and an extension plate having one end rotatably coupled to the other end of the lower plate, the extension plate configured to be disposed on the upper side of the lower plate by rotation thereof or disposed on the outside of the lower plate so that an upper surface of the extension plate is parallel to an upper surface of the lower plate.

15. The rooftop tent of claim 14, wherein a tension pole bracket configured to support a pole is provided at the other end of the extension plate, and the tension pole bracket includes a coupling bracket provided so as to surround the other end of the extension plate and having a tension pole insertion hole into which the pole is inserted, and a rigid reinforcement panel slidingly coupled to one surface of the coupling bracket having the tension pole insertion hole and configured to support an end of the pole when the pole is inserted into the tension pole insertion hole.

16. The rooftop tent of claim 14, wherein a through-hole is formed in at least one of the lower plate and the extension plate, and a tube cap is inserted into and coupled to the through-hole.

17. The rooftop tent of claim 16, wherein the tube cap includes a lower cap inserted into the through-hole and fixed to the lower plate or the extension plate and having a passage formed therein, and an upper cap detachably coupled to one end of the lower cap to open and close the passage.

\* \* \* \* \*